Jan. 5, 1965

W. E. ELLIS 3,164,388

PACKING APPARATUS FOR STUFFING BOXES

Filed March 27, 1961

INVENTOR.
Warren E. Ellis
BY
Hovey, Schmidt, Johnson & Hovey
ATTORNEYS.

United States Patent Office 3,164,388
Patented Jan. 5, 1965

3,164,388
PACKING APPARATUS FOR STUFFING BOXES
Warren E. Ellis, Rte. 2, Madison, Kans., assignor of one-fourth to Lloyd J. Ellis, Lamont, Kans.
Filed Mar. 27, 1961, Ser. No. 98,674
9 Claims. (Cl. 277—18)

This invention relates to an improved packing for stuffing boxes or the like, and has for its most important object the provision of such a packing designed to receive lubrication to its wearing surfaces, thus prolonging the useful life of the packing.

A further object is to provide a packing having integral reservoirs for providing a readily available supply of lubricating fluid at all times.

Another object is to provide a packing having grooves on both its inner and outer surfaces with passages communicating between the grooves to provide lubrication to the inner surface.

Still another object is to provide a packing having passages of diamond shaped cross section in order that the passages will not become closed as the packing is compressed.

Another object is to provide a packing that will allow for reciprocating movement of a rod in contact with a surface of the packing member, yet provide an effective seal against leakage of fluid under pressure along the surface.

Another object is to provide a packing which may be quickly and easily installed in the stuffing box.

Still other important objects of the invention will be made clear or become apparent as the following description of the invention progresses.

Figure 5:
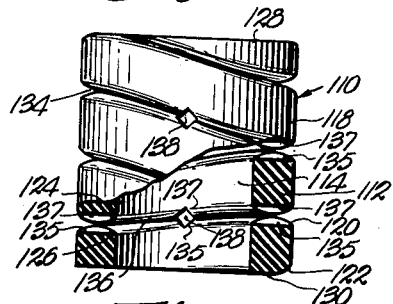
Figure 6:
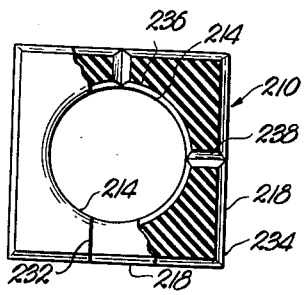

FIG. 5 is a side elevational view of a modified form of packing member made in accordance with the instant invention, a part thereof also being broken away and shown in cross section for clarity of illustration; and FIG. 6 is a top plan view of another modified form of packing member made in accordance with the instant invention, a part thereof also being broken away and shown in section for purposes of clarity.

In the production of crude oil it is desirable to have a pump extending into the well near the oil level, yet have the power plant for motivating the pump situated at ground level. This is conventionally achieved with the piston of a cylinder pump in the well rigidly coupled to a rod extending to the top of the well. Reciprocating the rod acuates the piston of the pump, thereby pumping the oil to the surface.

Figure 1:
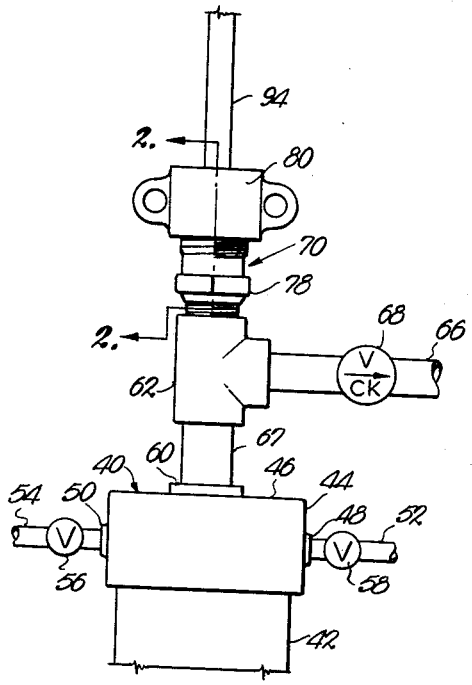
FIGURE 1 is an elevational view of a casing head installation.

A casing head assembly broadly designated 40 in FIG. 1, is conventionally utilized to receive the oil and control its flow as it leaves the well. Assembly 40 includes a cylindrical casing 42 extending into and lining the well. Threadably engaging casing 42 and in closing relation thereto, is a generally cylindrically-shaped casing head 44 provided with a top 46 substantially plugging the top end of the casing 42.

Casing head 44 is provided with a plurality of threaded apertures 48 and 50 for threadably engaging pipes 52 and 54 for either the ingress or egress of fluid to the well. Suitable valves as 56 and 58, are provided in pipes 54 and 52 to control the flow of fluid to or from the well. Top 46 of casing head 44 is provided with a threaded aperture 60 for interconnecting a flow T 62 by nipple 64. T 62 communicates with pipe 66 for the conducting of oil from the well to an appropriate reservoir not shown. A check valve 68 is normally placed in pipe 66 adjacent T 62 to prevent the retrograde flow of oil from the reservoir back into the well. Projecting from T 62 coaxial with casing 42, is a stuffing box assembly broadly enumerated 70. Stuffing box 70 is provided to direct the flow of oil through check valve 68 and into pipe 66, yet allowing for the motivation of the rod (not shown) which is contained within casing 42.

Figure 2:
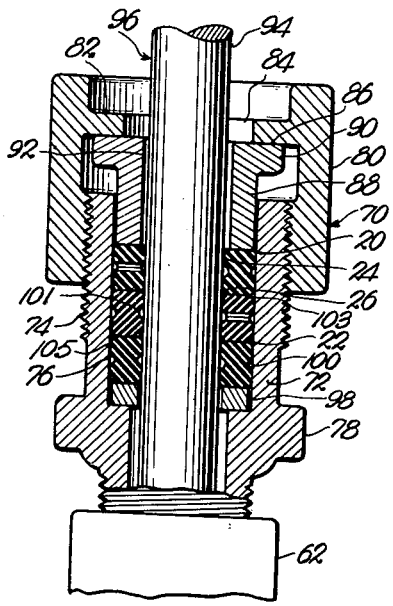
FIG. 2 is an enlarged, vertical, cross-sectional view taken along line 2—2 of FIG. 1 with the polished rod shown in elevation.
Figure 3:
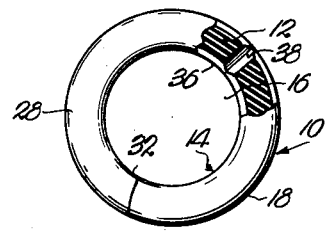
FIG. 3 is a top plan view of a packing member embodying certain of the concepts of the present invention with parts thereof being broken away and shown in cross section for purposes of clarity.
Figure 4:
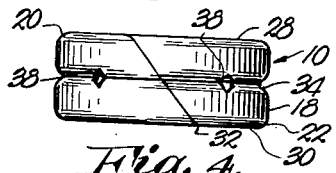
FIG. 4 is a side elevational view of the packing member illustrated in FIG. 3.

The stuffing box assembly 70 includes a generally cylindrical base section 72 provided with a partially threaded outer surface 74 and a smooth inner surface 76. Base section 72 is externally threaded adjacent one end thereof for threadably engaging T 62 as shown in FIGS. 1 and 2. The outside surface 74 is provided with an enlarged, annular portion 78 which may have a plurality of sides to present a suitable surface for engaging a wrench whereby base section 72 may be removed from T 62.

A generally cup-shaped top section 80 is threaded internally adjacent one end for threadable engagement with outer surface 74 of base section 72. A perpendicularly extending flange 82 protrudes from section 80. Flange 82 defines an aperture 84. Flange 82 is provided with a surface 86 which bears against an annular bushing 88 having a protruding flange section 90 integral with one end thereof for complementably receiving surface 86 of top section 80. Bushing 88 is provided with a bore 92 therethrough.

Assembly 70 includes a polished rod 94 aligned coaxially with bushing 88, casing 42, pipe 66, and surface 76 of base section 72. Polished rod 94 is an elongated, transversely circular rod having a polished external surface 96 to reduce the friction upon reciprocating movement of rod 94. Rod 94 is rigidly coupled with the rod not shown, which actuates the piston of the pump within the well.

The packing member broadly designated 10, includes an annularly-shaped body 12 of generally rectangular cross section form of any of several resilient or elastic packing materials such as rubber, neoprene or the like, as will be well known in the art. Body 12 is provided with a generally cylindrical inner surface 14 and with a concentric, generally cylindrical outer surface 18. Outer surface 18 is slightly rounded adjacent each end, presenting arcuate rims 20 and 22 where surface 18 joins opposed, parallel end surfaces 28 and 30 extending perpendicular to the axis of body 12. Inner surface 14 is likewise slightly rounded adjacent each end and presents arcuate rims 24 and 26 where surface 14 joins end surfaces 28 and 30.

Body 12 is provided with a diagonal slit 32 extending at an angle from the axis of body 12 and interconnecting surfaces 14, 18, 28 and 30.

A lubricant reservoir in the nature of a groove 34 completely encircling body 12, is disposed on outer surface 18 midway between rims 20 and 22. A further lubricant reservoir in the nature of a similar groove 36 on inner surface 14, is disposed opposite groove 34. Extending radially outwardly from bore 16 through body 12, are a plurality of preferably transversely diamond-shaped passages or conduits 38 interconnecting surfaces 14 and 18 and terminating in grooves 36 and 34 respectively, placing the latter in communication with each other.

In the embodiment illustrated in FIG. 2, a plurality of packing members 10 are disposed in superimposed relation within the stuffing box 70. An annular washer 98 is disposed in encircling relation to rod 94 adjacent one end of base section 72. Members 10 are stacked so that an end surface 30 of one is in contact with washer 98 and an end surface 28 contacts the corresponding end surface 30 of the adjacent member. Bushing 88 engages the end surface 28 of the uppermost member 10 as shown in FIG. 2.

The inside surface 14 of each member 10 engages the polished surface 96 of rod 94, and the outside surface 18 of each member 10 engages the inside surface 76 of base section 72 to provide an effective seal between the latter and the polished rod 94. Of course, as is obvious in FIG. 2, the members 10 may be compressed by threadably tightening top section 80 down upon base section 72, thereby shifting bushing 88.

As the members 10 provide an effective seal between the inner surface 76 and the polished surface 96, the polished rod 94 may be reciprocated with respect to the stationary stuffing box 70 without fluid from within casing 42 leaking around the rod 94. It has been found, however, that when conventional packing members are used for effecting this seal, the reciprocation of rod 94 causes the packing members to become heated from the frictional contact with the polished surface 96. This results in abnormally rapid wear to conventional stuffing members, thus impairing the effectiveness of the seal and requiring frequent replacement. Heretofore, no provision has been made for the effective lubrication of the surfaces of stuffing members, thus adding to the problems of undue wear.

Inasmuch as grooves 34 are disposed adjacent to the outer surfaces to be sealed, an annular lubricant storing cavity 100 is thereby presented between each member 10 and the box surface 76. This cavity 100 serves as a reservoir for a small portion of the oil or other lubricant fluid drawn up from the well, which can be employed to lubricate the member 10. Such fluid is present on rod 94 and enters cavity 100 because of the pressure or movement of the fluid as rod 94 is reciprocated. Similarly, grooves 36 provide a lubricant applying reservoir 101 in the inner surface 14 of each member 10. These reservoirs 100 and 101, connected by passage 38, provide means for accumulating and continuously applying lubricant for the surface 14 as it slidably engages the surfaces 96 of rod 94. Such lubrication effectively decreases the frictional wear, reduces the temperature of member 10, and consequently allows for longer wearing life.

Inasmuch as conduits 38 communicate between grooves 34 and 36, they provide a passage for the flow of fluid from the reservoirs 100 to the reservoirs 101. Thus, fluid that is present in the reservoir 100 is always available to flow to surface 96 as needed to lubricate the latter. It has been found that conduits of circular cross section tend to become closed and do not allow for adequate flow as the members 10 are compressed between washer 98 and bushing 88 to provide an effective seal between surfaces 96 and 76. However, if the conduits 38 are transversely diamond shaped with the apexes disposed in parallel alignment with the longitudinal axis of rod 94, a sufficient passage remains open to insure proper lubrication.

The arcuate rims 20 and 22, 24 and 26 are complementally engaged as the members 10 are disposed in superimposed relationship, thereby presenting additional reservoirs 103 and 105 as shown in FIG. 2. Such additional storage space tends to increase the supply of fluid available for lubrication, although that contained in reservoir 103 adjacent surface 76 will tend to seep along the latter before reaching a conduit 38 to flow to surface 96.

Inasmuch as it will not be readily possible to withdraw polished rod 94 from its operating position whenever it is necessary to replace the members 10, the latter are provided with a slit 32 so that the body 12 may be separated. This allows for the member 10 to be disposed around the rod 94 with the latter remaining in place. It has been found that a 45° slit is well suited for this purpose without impairing the sealing effectiveness of the members 10.

A modified form of packing member is broadly designated 110 in FIG. 5. The member 110 includes an elongated, helically wound body 112 of rubber or other resilient stuffing material. The body 112 is wound to present a pair of end surfaces 128 and 130 and a cylindrical outer surface 118. A cylindrical inner surface 114 concentric with surface 118, defines a bore adapted to receive a polished rod 94. Body 112 has outer arcuate rims 120 and 122 disposed opposite and adjacent each other at an angle. The rims 120 and 122 diverge as the outermost margins of body 112 are approached to present an outwardly facing, spiral outer groove 134 therebetween. Similarly, body 112 is provided with inwardly facing, arcuate rims 124 and 126 oppositely disposed adjacent each other and at an angle, thereby diverging as the innermost margins of body 112 are approached to present an inwardly facing, spiral groove 136 therebetween. A plurality of V-shaped notches 135 in body 112 connect rim 120 with rim 126. Oppositely disposed similar notches 137 connect rim 122 with rim 124 and overlie notches 135 to form transversely diamond-shaped conduits 138 communicating between grooves 134 and 136. The latter are continuous and communicate with surface 128 and surface 130.

As can be seen from FIG. 5, a helical member 110 which may be wound around polished rod 94, and capable of effecting a fluid seal between polished surface 96 and inner surface 76, is thus presented. Member 110 is provided with fluid retaining reservoirs and conduits to perform the necessary lubrication as explained with respect to member 10.

Another modified form of packing member is illustrated in FIG. 6 and broadly enumerated 210. The latter is provided with a bore engaging inner surface 214 and a stuffing box engaging outer surface 218. The outer surface 218 differs from the outer surface 18 and 118 in that surface 218 is polygonally-shaped to receive a complementally-shaped packing box inner surface not shown. It will be appreciated that the outer surface 218 may take whatever shape necessary to conform with the packing box. Inner surface 214 is provided with a groove 236 and outer surface 218 is provided with a groove 234. The grooves are interconnected with radial, transversely diamond-shaped conduits 238. Member 210 is also provided with a diagonal slit 232 interconnecting inner surface 214 and outer surface 218.

It will be readily understood that member 210 could be utilized as a seal for an appropriately shaped stuffing box. Inasmuch as member 210 is provided with grooves 234 and 236 with conduits 238 communicating therebetween, the necessary lubrication would be provided for surface 214 engaging polished surface 96 as has been explained.

Although the invention has been discussed with relation to its utilization in the production of crude oil, it will be appreciated that the concept of the present invention will have utility in many other fields. A packing box member as disclosed, can be used equally advantageously to provide for the necessary lubrication to prevent undue wear to stuffing material while maintaining an effective seal against the escape of liquid in almost any kind of mechanical seal.

Having thus described the invention, what is claimed as new and desired to be secured by Letters Patent is:

1. A stuffing box packing member comprising a body of resilient stuffing material having a pair of end surfaces, an outer stuffing box engaging surface, and an inner surface defining an opening therethrough extending between said end surfaces for slidably receiving a reciprocable rod; continuous groove means on said inner surface presenting a reservoir for lubricating fluid; continuous groove means on said outer surface presenting a reservoir for lubricating fluid; and passage means in said body placing said reservoirs in communication with each other.

2. A member as set forth in claim 1, wherein said passage means comprises at least one conduit extending through said body and communicating at the opposite extremities thereof with each of said grooves respectively.

3. A member as set forth in claim 2, wherein said conduit is polygonal in cross section.

4. A member as set forth in claim 3, wherein said conduit is diamond shaped in cross section and has a pair of the apexes thereof disposed on a line substantially parallel to the axis of said rod.

5. A member as set forth in claim 1, wherein said body is transversely polygonal and has a plurality of generally planar outer sides defining the outer surface thereof.

6. A stuffing box packing member comprising an elongated, helically wound body of stuffing material and having a pair of end surfaces, an outer stuffing box engaging surface, and an inner surface therethrough extending between said end surfaces for slidably receiving a reciprocable rod; means on said inner surface and substantially spanning the distance between the ends of the body presenting a reservoir for lubricating fluid; means on said outer surface and substantially spanning the distance between the ends of the body presenting a reservoir for lubricating fluid; and passage means in said body placing said reservoirs in communication with each other.

7. A member as set forth in claim 6, wherein said means presenting a reservoir on said inner surface and said means presenting a reservoir on said outer surface each comprises a groove formed in each of said surfaces respectively.

8. A member as set forth in claim 7, wherein said body is provided with opposed, outwardly facing, arcuate surfaces disposed at an angle with respect to each other and diverging as the outermost margins thereof are approached to present an outwardly facing, spiral groove therebetween, and said body is provided with opposed, inwardly facing, arcuate surfaces disposed at an angle with respect to each other and diverging as the innermost margins thereof are approached to present an inwardly facing, spiral groove therebetween.

9. A member as set forth in claim 7, wherein each of said grooves is continuous and communicates with said upper and lower surfaces.

References Cited in the file of this patent

UNITED STATES PATENTS

| | | |
|---|---|---|
| 1,307,901 | Farland et al. | June 24, 1919 |
| 2,113,098 | Skinner | Apr. 5, 1938 |
| 2,234,520 | De Shong | Mar. 11, 1941 |
| 2,688,506 | Bakker | Sept. 7, 1954 |
| 2,760,749 | Ratigan | Aug. 28, 1956 |

FOREIGN PATENTS

| | | |
|---|---|---|
| 406,937 | Germany | Dec. 5, 1924 |
| 463,797 | Canada | Mar. 21, 1950 |
| 910,238 | Germany | Apr. 29, 1954 |